United States Patent [19]

Capelle

[11] Patent Number: 5,000,670
[45] Date of Patent: Mar. 19, 1991

[54] AIR DISCHARGE DEVICE FOR EXTRUSION HEAD

[75] Inventor: Gerd Capelle, Langenhagen, Fed. Rep. of Germany

[73] Assignees: Foley & Lardner, Schwartz et al., P.O. Box 299, ; 1 5 01021991 084 03191991 DEX Fed. Rep. of Germany 01141989 3900952 5 1 1 Nguyen; Khanh P. Woo; Jay H. 1 3 070111299 13; Hermann Berstorff Maschinenbau GmbH, Hanover, Fed. Rep. of Germany

[21] Appl. No.: 459,355

[22] Filed: Dec. 29, 1989

[30] Foreign Application Priority Data

Jan. 14, 1989 [DE] Fed. Rep. of Germany ....... 3900952

[51] Int. Cl.⁵ .......................... B29B 7/72; B29B 7/84; B29C 47/76
[52] U.S. Cl. ..................................... 425/135; 366/75; 366/77; 425/203; 425/382.4; 425/812
[58] Field of Search ..................... 425/188, 203, 382.9, 425/812, 546, 420, 376.1, 420, 461, 135; 366/75, 77; 264/40.1

[56] References Cited

U.S. PATENT DOCUMENTS

| | | | |
|---|---|---|---|
| 3,193,876 | 7/1965 | Thompson | 425/812 |
| 3,535,737 | 10/1970 | Hendry | 366/75 |
| 3,924,997 | 12/1975 | Kosinsky | 425/382.4 |
| 4,255,161 | 3/1981 | Guinminger et al. | 425/203 |
| 4,642,039 | 2/1987 | Anders | 425/188 |
| 4,695,236 | 9/1987 | Predohl et al. | 425/382.4 |
| 4,822,269 | 4/1989 | Kamiyama et al. | 366/75 |

FOREIGN PATENT DOCUMENTS

| | | |
|---|---|---|
| 2201631 | 8/1973 | Fed. Rep. of Germany ...... 425/188 |
| 3212157 | 10/1983 | Fed. Rep. of Germany . |
| 60-214919 | 10/1985 | Japan ................................. 425/203 |
| 2131734 | 8/1983 | United Kingdom . |

Primary Examiner—Jay H. Woo
Assistant Examiner—Khanh P. Nguyen
Attorney, Agent, or Firm—Foley & Lardner; Foley & Lardner

[57] ABSTRACT

An extrusion head for processing rubber or thermoplastic plastics material including a housing flange-mountable on a screw extrusion device. The head further including an inlet region for receiving material from the extrusion device and for receiving the downstream end of the screw, the inlet leading into a flow channel portion and a nozzle outlet which receives the material from the flow channel for extrusion in the form of a shaped profile. A sealable air discharge device is disposed in the flow channel portion to remove air bubbles, particularly that which is formed during the start up phase of the extrusion downstream of the downstream end of the screw.

5 Claims, 1 Drawing Sheet

AIR DISCHARGE DEVICE FOR EXTRUSION HEAD

FIELD OF THE INVENTION

The present invention relates to an extrusion head. More particularly, the present invention relates to an extrusion head which is flange-mountable on an extrusion device, the head including an extrusion nozzle and a flow channel portion through which rubber or thermoplastic plastics material flows during its passage to the extrusion nozzle.

BACKGROUND OF THE INVENTION AND PRIOR ART DISCUSSION

An extrusion head of the above-described general type is disclosed in German Patent Specification No. 3 212 157 and in British Patent Specification No. 2 131 734. In such prior specifications, the manufacture of a profile made of rubber, which is ultimately intended for use in the production of a motor vehicle tire or the like is discussed.

A rubber mixture is extruded in an extrusion device. The mixture is forced into a flow channel in the extrusion head by the extrusion device and is shaped by the flow channel and by the extrusion nozzle to produce a profile of the desired configuration.

If the material being extruded is a highly viscous mixture of rubber and/or plastics materials, particularly if the extruder screw or screws utilised have a relatively large diameter, a problem arises during the commencement of the extrusion process in that an air-filled cavity is formed immediately downstream of the end of the extrusion screw or screws. The air is gradually removed from the cavity by being incorporated in the mixture or by being entrained therewith. In consequence, air bubbles will be present in the extruded profile until substantially all the air, which collects downstream of the end of the extrusion screw when the extrusion head commences its operation, has been discharged from the flow channel portion. In a relatively large extrusion device, this disadvantage means that, for a period of approximately two hours, a defective profile is produced and only thereafter is a profile produced which is free from air bubbles.

OBJECT OF THE INVENTION

The present invention seeks to provide an extrusion head in which the above-identified disadvantages are obviated or at least minimized and from which the extruded profile of the desired quality is produced from the outset.

SUMMARY OF THE INVENTION

According to the present invention, there is provided an extrusion head for processing rubber or thermoplastic plastics material comprising a housing which is flange-connectable to a screw extruder, the housing defining an inlet region for receiving material extruded from the extruder and for receiving the downstream end of the screw, the inlet region opening into a flow channel portion and an extrusion nozzle for producing a profile of the extruded material of the desired shape, wherein an air discharge device is disposed in the flow channel portion, the air discharge device including means for sealing the flow channel portion.

Since a sealable air discharge device is provided in the flow channel portion which, in use, is disposed immediately downstream of the downstream end of the screw, any air bubbles which are formed at such location, particularly the air bubbles produced during the starting-up phase, are very rapidly removed from the flow channel portion. Thereafter, the extruded shape is produced within a very short space of time and is substantially completely air bubble-free. Only a small quantity of unusable material is therefore produced during the start-up phase.

The air discharge conduit is fixed and extends into the region immediately downstream of the downstream end of the screw. An air pocket is formed in the mixture being extruded in this region during the start-up phase, particularly if screws having a relatively large diameter are being utilised.

Preferably, the air discharge device comprises an air discharge conduit which projects into the flow channel downstream, in use, of the downstream end of the screw.

Desirably, a laterally disposed air discharge aperture is formed in the air discharge conduit, the aperture communicating with the atmosphere through a further conduit.

This feature is provided so that air can escape from the extrusion head. The air discharge process is continued until the mixture being extruded enters the air discharge conduit, which indicates that the air bubble has been removed.

Advantageously, a laterally disposed pressure sensor is provided in the air discharge conduit, the sensor terminating flush with the internal wall of the air discharge conduit.

Once the air bubble formed downstream of the downstream end of the screw has been removed, the extruded mixture enters the conduit and builds up a pressure therein. This pressure is detected and indicated by the pressure sensor. When a preselected pressure value is reached the sealing device is automatically activated to drive the piston into its sealing position, so that the mixture is prevented from entering the air discharge aperture and the conduits communicating therewith.

The piston is then moved to the orifice of the air discharge pipe, whereby the mixture which has entered therein is forced back into the flow channel portion, and the conduit is sealed. If desired, the conduit itself, together with the sealing piston, may be retracted so that it terminates flush with the lower wall of the flow channel.

Further preferably, the sealing means comprises a sealing piston which is displaceable in the air discharge conduit, the sealing piston being connected to a stem member associated with a hydraulic or pneumatic piston and cylinder arrangement.

Alternatively, the sealing means comprises a piston mounted on a spindle, the spindle engaging in a threaded portion of a further housing mounted on housing of the extrusion head.

BRIEF DESCRIPTION OF THE DRAWINGS

Certain embodiments of an extrusion head in accordance with the present invention will be further described, by way of example, with reference to the accompanying drawings, in which.

DESCRIPTION OF PREFERRED EMBODIMENTS

Figure 1:
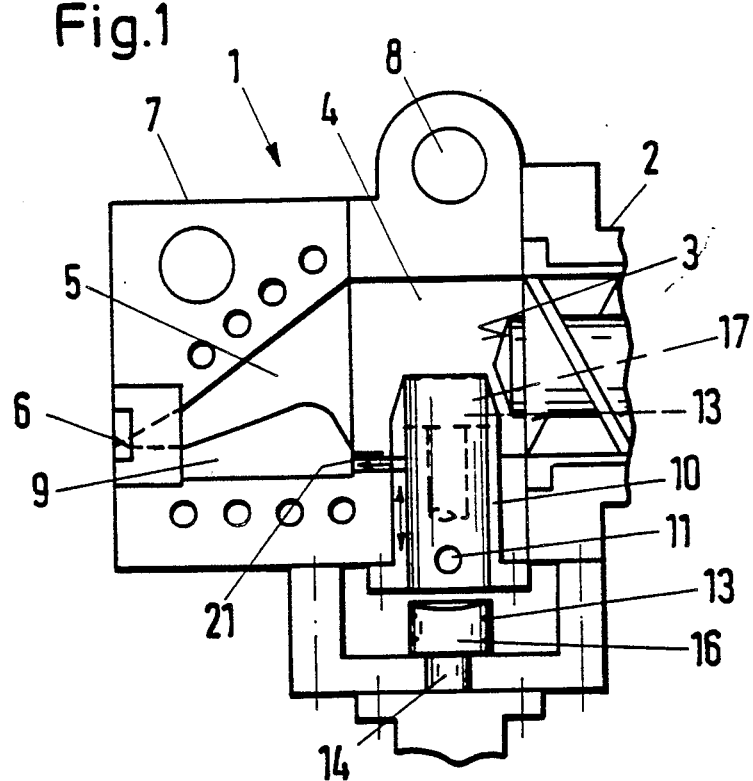
FIG. 1 is a longitudinal sectional view through an extrusion head in accordance with the present invention.

In the drawings, there is shown an extrusion device 2, which is flange-mounted on an extrusion head 1. The extrusion device comprises a screw which is rotatable in a barrel (not shown) with the downstream end of the screw projecting into a flow channel portion 4 of the head 1. A conduit 5 which is used to shape the extrusion communicates with the flow channel portion 4 and leads to a nozzle orifice 6.

In the embodiment shown in FIG. 1, the extrusion head 1 includes an upper portion 7 which is upwardly pivotable about a pivot point 8. The pivoting of the portion 7 away from the remainder of the head 1 permits the flow channels to be cleaned when necessary. A displacement member 9 is disposed in the shaping conduit 5 to bring about uniform distribution of the material in the conduit 5.

An air discharge conduit 10 protrudes into the flow channel portion 4 and has a laterally directed air discharge aperture 11 formed therein. The aperture 11 communicates with the atmosphere through the intermediary of a further conduit (not shown). The conduit 10 may be moved downwardly by suitable displacement means (not shown) and, together with the piston 13, then terminates flush with the wall of the flow channel 4.

A displaceable piston 13 is disposed in the air discharge conduit 10. Such piston 13 is mounted on the piston of a hydraulic piston and cylinder arrangement 15 through the intermediary of a stem member 14.

By activating the hydraulic piston and cylinder arrangement 15, the piston 13 shown in FIG. 1 is displaced from its lower position 16 shown in full lines in FIG. 1 into its upper position 17 shown in dotted lines.

When the piston 13 is in the lower position 16, the air discharge conduit 10 and the air discharge aperture 11 are open, so that the air bubble formed downstream of the downstream end of the extruder screw during the starting-up process can be removed.

A pressure sensor 21 is provided within the air discharge conduit 10. When this indicates that a preselected pressure value has been reached, the piston 13 is moved into its upper position 17 by the hydraulic piston and cylinder arrangement 15. This prevents the extruded mixture from entering the air discharge aperture 11.

Figure 2:
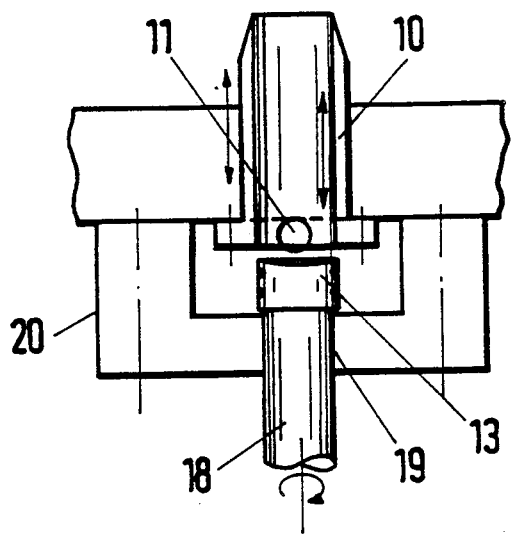
FIG. 2 shows a detail of the extrusion head shown in FIG. 1, particularly an air discharge conduit and a displaceable sealing piston for closing the conduit but modified in that the means for displacing the piston is different to that shown in FIG. 1.
Figure 3:
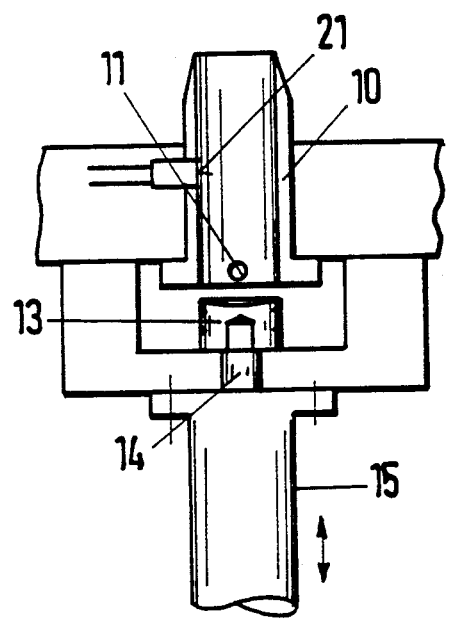
FIG. 3 shows a detail similar to FIG. 2 but with the means for displacing the piston being identical to that shown in FIG. 1.

In the embodiment illustrated in FIG. 2, the piston 13 is displaced by means of a rotating spindle 18 connected thereto instead of by a piston and cylinder arrangement. The spindle 18 rotates in a threaded portion 19 of a housing 20 which is mounted on the head 1.

If any extruded material enters the air discharge conduit 10 after the air has been removed, the piston 13 is moved into its upper position 17 by means of the hydraulic piston and cylinder arrangement 15 or by the spindle 18. This forces such material back into the channel portion 4 and the conduit 10 itself is then sealed, so that the extrusion process can be continued in an uninterrupted manner.

I claim:

1. An extrusion head for processing mixtures of rubber or thermoplastic material comprising:
   (a) a housing adapted to be connected to a screw extruder having a screw extending from the input end of said extruder to near the discharge end of said extruder downstream of said inlet end, said housing defining an inlet for receiving material extruded from said extruder and for receiving the downstream end of the screw of said extruder;
   (b) a flow channel having internal walls and communicating with said inlet for receiving said extruded material;
   (c) an extrusion conduit and nozzle communicating with said flow channel for producing a profile of the extruded material in a desired shape;
   (d) an air discharge conduit communicating with said flow channel and with ambient projecting atmosphere, said air discharge conduit having a first end region projecting into said flow channel in the region thereof immediately downstream of said downstream end of said screw, said air discharge conduit having a transverse air discharge aperture which communicates with a further air discharge conduit open to ambient atmosphere whereby air can be discharged from said discharge conduit in a direction generally transverse to the directon of flow of extruded material through said flow channel;
   (e) means for sealing said air discharge conduit from ambient atmosphere, and
   (f) a pressure sensor disposed in said air discharge conduit and terminating flush with the internal walls of said discharge conduit, said pressure sensor actuating said sealing means when a predetermined pressure has been reached thereby to prevent extruded material from entering said air discharge aperture.

2. An extrusion head as recited in claim 1, wherein said sealing means comprises a sealing piston disposed within said air discharge conduit, and means for displacing said sealing piston in said air discharge conduit, said displacement means comprising a stem operatively connected to said sealing piston, and a piston and cylinder arrangement operatively connected to said stem.

3. An extrusion head as recited in claim 2, wherein said piston and cylinder arrangement is hydraulically actuated.

4. An extrusion head as recited in claim 2, wherein said piston and cylinder arrangement is pneumatically actuated.

5. An extrusion head as recited in claim 1, further comprising a second housing mounted on said housing of said extruder head, said second housing having a threaded opening, and wherein said sealing means comprises a sealing piston including a piston head and a spindle on which said piston head is mounted, said spindle having threads formed on its external periphery which cooperatively engage with said threaded opening formed in said second housing, whereby rotation of said spindle moves the same longitudinally into a sealing position.

* * * * *